Patented July 10, 1928.

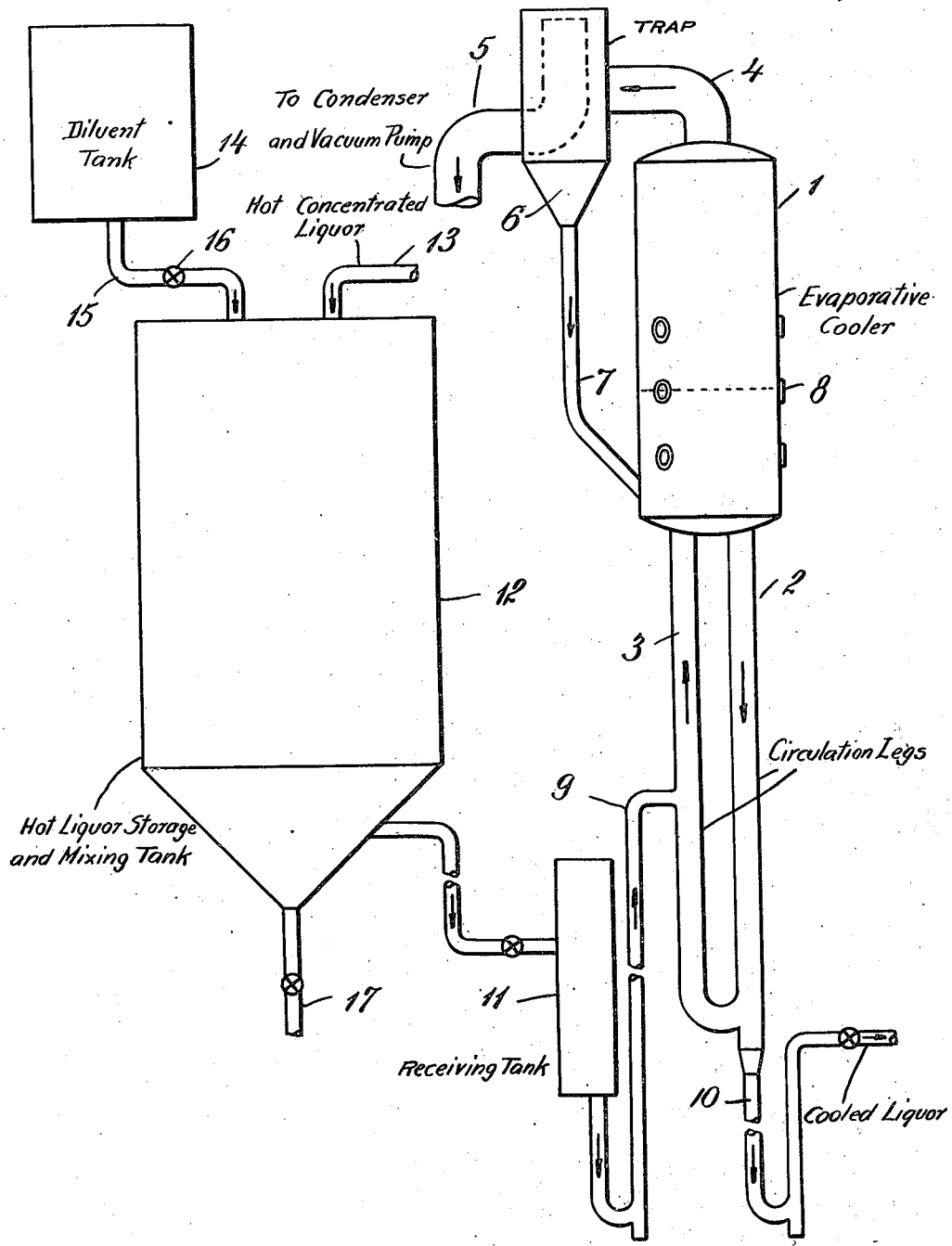

1,676,277

UNITED STATES PATENT OFFICE.

RUSSELL W. MUMFORD, OF TRONA, CALIFORNIA, ASSIGNOR, BY MESNE ASSIGNMENTS, TO AMERICAN POTASH & CHEMICAL CORPORATION, OF NEW YORK, N. Y., A CORPORATION OF DELAWARE.

COOLING APPARATUS.

Application filed September 14, 1925. Serial No. 56,122.

This invention relates to improvements in apparatus for rapidly and continuously cooling hot liquors, such as salt solutions and the like. The apparatus of the invention is useful in connection with the cooling of hot liquors containing crystallizable constituents, such as salt solutions, particularly as a step in the recovery of crystallizable constituents therefrom after concentration of the liquor by evaporation at high temperature.

When liquors saturated or nearly saturated with crystallizable constituents the solubility of which decreases with decreasing temperature are cooled, crystallization takes place due to the lower solubility at lower temperature. This is a general method of recovering such dissolved crystallizable constituents from solution. This method is also employed for the separation and recovery of one or more such crystallizable constituents from complex solutions which may also contain other crystallizable constituents the solubility of which either does not decrease on cooling or does not decrease at as great a rate with respect to temperature drop as does that of the constituents to be separated. For practical purposes, it is frequently desirable to carry out such cooling operations rapidly and continuously, for example, to conserve space, time and equipment. In certain cases, for example, in the separation of crystallizable constituents from liquors which also contain other crystallizable constituents having similar solubility-temperature characteristics but which are also capable of a higher degree of supersaturation than the constituents to be separated, rapid cooling may be essential to effective separation and recovery of the desired constituents.

It is one object of the present invention to provide an improved apparatus for carrying out such operations rapidly and continuously. Other objects and advantages of the invention will appear as the description proceeds.

There have been proposals intended to accelerate the rate of cooling, but as applied to the cooling of hot concentrated liquors containing crystallizable constituents, such as hot concentrated salt solutions, they have not been entirely satisfactory. For example, it has been proposed to employ tanks fitted with extensive cooling surfaces in the shape of jackets, pipe coils, or calandria of the evaporator type through which some cooling medium is passed, but, even with strong agitation of the liquor being cooled, there is a tendency in such apparatus to heavy crystal formation on the cooling surfaces. With attempts to increase the rate of cooling in such apparatus, difficulties due to crystal formation on the cooling surfaces increase rapidly. Such crystal formation impedes heat transfer, and consequently retards the rate of cooling and decreases the capacity of the apparatus. It also necessitates frequent shut down for cleaning of the cooling surfaces, interfering with continuity of operation, as well as frequently requiring the rerunning of wash liquors employed in cleaning for the recovery of valuable dissolved constituents. It has also been proposed to cool such liquors by evaporation of liquid constituents therefrom, but, while in the apparatus of such prior proposals some of the difficulties due to the formation of crystal deposits on cooling surfaces have been mitigated, clogging and other difficulties due to crystal formation in the apparatus, particularly at the point at which fresh hot liquor is introduced, have interferred with satisfactory operation, particularly with respect to rapid cooling. Another object of the invention is to overcome difficulties of this character.

In the apparatus of the present invention, rapid cooling is effected by evaporation of liquid constituents of the liquor under reduced pressure, and provision is made for rapid circulation of the liquor undergoing cooling, particularly past the point at which fresh hot liquor is introduced. By employing direct evaporative cooling, difficulties due to crystal formation on heat transferring surfaces are avoided, and, by employing circulation in conjunction therewith, the formation or growth of crystal deposits in the apparatus is inhibited and crystallized constituents are kept in suspension in the circulating liquor. Where fresh hot liquor is introduced into comparatively quiescent and substantially cooler liquor, crystallization or "salting-up" at the point of introduction ensues as the fresh liquor is cooled immediately on contact with the cooler liquor. In the apparatus of the present invention, such effects are avoided as the agitation due to circulation distributes the fresh hot liquor throughout the cooler liquor in the apparatus as it is introduced and the circulation also rapidly carries the fresh liquor and any constituents crystallized therefrom away from the point of introduction. For controlling the operation of the apparatus, means are also provided, in accordance with this invention, for supplying a suitable diluent in appropriately regulated amounts together with the liquor to be cooled.

The invention will be further described in connection with the accompanying drawings which illustrate, in a somewhat diagrammatic and conventional manner, one form of apparatus embodying the invention; but it is intended and will be understood that this further description and illustration are for the purpose of exemplification and that the invention is not limited thereto.

Referring to the drawings, the evaporative cooler comprises a vaporizing chamber 1 provided with a pair of circulation legs, 2 and 3, the circulation legs being connected at their lower ends and opening at their upper ends into the vaporizing chamber below the normal liquid level therein. The circulation legs form with the vaporizing chamber a closed circulatory path or cycle. A connection 9 is arranged for introducing fresh hot liquor into the circulation leg 3 at an intermediate point, and a connection 10 is arranged for withdrawing cooled liquor from the lower end of the circulation leg 2. The vaporizing chamber is provided with observation ports 8 for noting the liquid level therein, and with suitable temperature and pressure indicating instruments (not shown) to assist in regulating the operation.

A vapor outlet 4 is arranged in the upper part of the vaporizing chamber, above the normal liquid level therein, and advantageously communicates with a trap 6 interposed in the outlet connection for effecting separation of any spray or foam entrained in the vapors. From the trap 6, vapors are withdrawn or escape through connection 5 and liquid is returned to the vaporizing chamber through connection 7. For cooling aqueous liquors below the boiling point of water, or of the liquor at atmospheric pressure, the outlet 5 is connected to suitable condensers and pumps for maintaining a vacuum or subatmospheric pressure in the vaporizing chamber and the vaporizing chamber is suitably constructed to withstand the excess external pressure. In other cases, and in the treatment of other types of liquors, it will be apparent that other pressures, either above or below atmospheric pressure, might be employed. In any case, the pressure on the liquor is reduced in the vaporizing chamber sufficiently to cause the vaporization necessary to effect the desired cooling.

In operation, a charge of liquor is maintained in the circulatory vaporizing system and fresh hot liquor is supplied to the circulating stream of liquor in the system through connection 9 from the receiver 11 and cooled liquor is withdrawn through connection 10. The supply of hot liquor and the withdrawal of cooled liquor are advantageously carried out continuously. In the vaporizing system, the liquor is subjected to the reduced pressure which is maintained therein and is cooled by the evaporation of liquid constituents therefrom due to the reduced pressure. Circulation within the system is maintained by the introduction of fresh hot liquor, ebullition of the fresh liquor and its lower density both causing an upward circulation in the leg 3 and a consequent downward circulation in the leg 2. Fresh hot liquor is thus thoroughly distributed throughout the cooler charge of liquor in the vaporizing system and is rapidly carried away from the outlet of connection 9 by the circulation and agitation within the system. The circulation in the system tends to sweep the internal surfaces of the apparatus free from crystal deposits, and the agitation within the system due both to the circulation maintained and to the ebullition of the liquor assists in maintaining crystallized constituents in suspension in the circulating liquor. The outlet connection 10 is advantageously arranged at the lower end of the circulation leg 2, to assist in maintaining circulation, but the connection for withdrawing cooled liquor may be arranged at some other point.

Where the desired cooling requires the maintenance of a vacuum or subatmospheric pressure in the vaporizing system, the apparatus of the invention is more particularly advantageous for cooling over higher temperature ranges where relatively smaller pressure reductions are sufficient to effect the requisite evaporation. For very great pressure reduction, the amount of equipment required and the power necessary are factors tending to off-set some of the advantages secured where the pressure reduction necessary to effect the requisite evaporation is not so great. Where cooling to temperatures requiring excessive pressure reduction is desired, the apparatus of the invention may with advantage be employed in conjunction with indirect cooling apparatus, the cooling being carried to an intermediate temperature in the evaporative cooler and then to the lower temperature in the indirect cooler. An increase in efficiency and capacity, as well as an increase in rapidity of operation, may thus be secured.

Due to the evaporation in the vaporizing system, the liquor circulating therein is concentrated as it is cooled. To provide for control of this concentration, or to prevent it, means are provided for supplying additional liquid constituents. In the apparatus illustrated, a mixing tank or receptacle 12 is provided into which the hot concentrated liquor to be cooled is discharged through connection 13 and into which a suitable diluent is introduced from a tank 14 or other source of supply through connection 15 which is provided with a control valve 16. Dilution of the hot liquor supplied to the cooler may thus be effected in the tank 12 as desired, the hot diluted liquor being discharged from the mixing tank 12 to the receiving tank 11 and then introduced into the circulation leg 3 through the connection 9. A draw-off connection for the tank or receptacle 12 is provided at 17.

For cooling without increasing concentration of the cooled liquor, diluent liquids are supplied in amount equal to those removed by evaporation. The degree of dilution may, however, be more or less than this. For example, where, in addition to the crystallizable constituent it is desired to separate, the hot liquor contains other crystallizable constituents the solubility of which also decreases on cooling but to a lesser extent, an excess of diluent over that required to replace the liquid constituents evaporated on cooling sufficient to maintain such other constituents in solution at the lower temperature may be supplied. In some cases, the hot liquor may contain, in addition to the crystallizable constituent it is desired to separate, other crystallizable constituents the solubility of which increases on cooling, and in such cases dilution sufficient to replace all of the liquid constituents evaporated during cooling may not be necessary. Here, dilution may in amount be sufficient only to keep such other constituents in solution at the lower temperature and some concentration may be effected during cooling. In other cases, for example, where all of the crystallizable constituents present are to be separated together as in the recovery of one salt from a simple solution of the salt, the cooling operation may include concentration without dilution, but even here dilution affords a convenient means for controlling the rate of crystallization within the apparatus.

It will thus be seen that the present invention provides an improved apparatus for rapid and continuous cooling of hot liquors and the like containing constituents susceptible of evaporation which has several important advantages. Direct cooling by evaporation is employed in conjunction with rapid circulation of the liquor undergoing evaporation. Difficulties due to crystal formation are thus avoided or reduced, and as the surface of the liquor from which evaporation is taking place is continually being replaced the cooling can proceed more or less independently of crystallization. The cleaning of cooling surfaces and the rerunning of wash liquors is also avoided or reduced. Small quantities of wash liquors may be employed as diluents in the operation of the apparatus so that their valuable constituents can be recovered without requiring separate operations. The circulation and agitation provided in the improved apparatus also make it possible to operate it with relatively large amounts of crystallized constituents in suspension in the liquor undergoing cooling therein. An apparatus of high capacity and adapted for rapid cooling with minimum requirements as to space and equipment in thus provided.

I claim:

1. An apparatus for cooling liquors containing constituents susceptible of evaporation, comprising a chamber adapted to be maintained under reduced pressure, a vapor outlet above the normal liquid level therein, a pair of depending circulation legs opening into the said chamber below the normal liquid level therein and communicating at their lower ends, the circulation legs forming with the said chamber a closed circulatory system, a connection for withdrawing liquor from the system, and a connection for supplying liquor to one of said legs at an intermediate point.

2. An evaporative cooling apparatus, comprising a chamber adapted to be maintained under reduced pressure including a vapor outlet arranged above the normal liquid level therein, conduits connected to said receptacle and forming therewith a closed system through which the liquid may circulate without diminution, means for maintaining circulation in said system, a connection for withdrawing liquor, and a connection for introducing liquor at a point on the circulatory system.

In testimony whereof I affix my signature.

RUSSELL W. MUMFORD.